United States Patent
Nix

(10) Patent No.: US 10,586,393 B2
(45) Date of Patent: Mar. 10, 2020

(54) POSITIONING OBJECTS IN AN AUGMENTED REALITY DISPLAY

(71) Applicant: Harman International Industries, Incorporated, Stamford, CT (US)

(72) Inventor: Axel Nix, Birmingham, MI (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 0 days.

(21) Appl. No.: 15/846,106

(22) Filed: Dec. 18, 2017

(65) Prior Publication Data

US 2018/0174368 A1 Jun. 21, 2018

Related U.S. Application Data

(60) Provisional application No. 62/437,028, filed on Dec. 20, 2016.

(51) Int. Cl.
| | |
|---|---|
| *G06T 19/00* | (2011.01) |
| *H04W 4/024* | (2018.01) |
| *H04W 4/02* | (2018.01) |
| *G01C 21/36* | (2006.01) |
| *G01C 21/32* | (2006.01) |
| *B60K 35/00* | (2006.01) |

(52) U.S. Cl.
CPC ............ *G06T 19/006* (2013.01); *G01C 21/32* (2013.01); *G01C 21/3655* (2013.01); *H04W 4/02* (2013.01); *H04W 4/024* (2018.02); *B60K 35/00* (2013.01); *G06T 2219/004* (2013.01)

(58) Field of Classification Search
CPC ......... G06T 19/006; G01C 21/32; H04W 4/02
See application file for complete search history.

(56) References Cited

U.S. PATENT DOCUMENTS

| | | | |
|---|---|---|---|
| 6,466,878 B1* | 10/2002 | Breedijk | G01M 17/022 702/41 |
| 6,801,850 B1* | 10/2004 | Wolfson | G01C 21/3415 340/995.23 |
| 2014/0142849 A1 | 5/2014 | Ziezold et al. | |
| 2014/0244153 A1 | 8/2014 | Dorum et al. | |
| 2015/0100179 A1* | 4/2015 | Alaniz | A63F 13/00 701/1 |
| 2016/0003636 A1 | 1/2016 | Ng-Thow-Hing et al. | |

FOREIGN PATENT DOCUMENTS

WO 2010/147730 A1 12/2010

OTHER PUBLICATIONS

Extended European Search Report for Application No. 17208946.8 dated May 23, 2018.

* cited by examiner

Primary Examiner — Ryan R Yang
(74) Attorney, Agent, or Firm — Artegis Law Group, LLP

(57) ABSTRACT

A technique for generating one or more maneuver points includes determining a first location at which a maneuver is initiated by a vehicle and determining a difference between the first location and a stored location that corresponds to the maneuver. The technique further includes, in response to determining that the difference exceeds a threshold value, transmitting the first location to an update application. The update application modifies the stored location based on the first location to generate an updated location.

20 Claims, 7 Drawing Sheets

POSITIONING OBJECTS IN AN AUGMENTED REALITY DISPLAY

CROSS-REFERENCE TO RELATED APPLICATIONS

This application claims priority benefit of the United States Provisional Patent Application titled, "TECHNIQUES FOR POSITIONING OBJECTS IN AN AUGMENTED REALITY DISPLAY," filed on Dec. 20, 2016 and having Ser. No. 62/437,028. The subject matter of this related application is hereby incorporated herein by reference.

BACKGROUND

Field of the Various Embodiments

The various embodiments relate generally to computer display systems and, more specifically, to techniques for positioning objects in an augmented reality display.

Description of the Related Art

A technology that is of growing interest is augmented reality (AR). Augmented reality involves displaying computer-generated content over a live view of a physical environment. The computer-generated content may be for entertainment or practical purposes. For example, augmented reality could be used in a car to display information to a driver.

An example of information that may be displayed to a driver via augmented reality is a maneuver indicator. A maneuver indicator indicates to the driver a maneuver to be performed along a route to a destination. Conventional techniques for displaying a maneuver indicator via augmented reality include algorithmically determining a maneuver point based on map data and positioning the maneuver indicator on the live view based on the maneuver point. For example, for a turn maneuver at an intersection, points in the map data corresponding to the roads intersecting at the intersection could be analyzed in order to determine a maneuver point for positioning a maneuver indicator.

Notably, determining a maneuver point for positioning a maneuver indicator at the proper location in an augmented reality display can be difficult. For example, an intersection may include a dedicated right turn lane. However, map data associated with the intersection may not include sufficient detail indicating where a driver should perform a turn maneuver when entering and/or driving in such a turn lane. Consequently, as a driver approaches an intersection to perform a right turn, a corresponding maneuver indicator, displayed based on a maneuver point determined from the map data, may not be displayed in the correct location from the perspective of the driver.

As the foregoing illustrates, what is need in the art are more effective techniques for positioning objects, such as maneuver indicators, in an augmented reality display.

SUMMARY

One embodiment sets forth a method for generating one or more maneuver points. The method includes determining a first location at which a maneuver is initiated by a vehicle and determining a difference between the first location and a stored location that corresponds to the maneuver. The method further includes, in response to determining that the difference exceeds a threshold value, transmitting the first location to an update application. The update application modifies the stored location based on the first location to generate an updated location.

Further embodiments provide, among other things, systems, devices, and computer-readable storage media configured to implement the method set forth above.

At least one advantage of the disclosed techniques is that the location at which vehicles typically perform a maneuver (e.g., a turn at a road interaction) can be more accurately determined. Accordingly, a maneuver indicator that corresponds to the maneuver can be displayed (e.g., on an augmented reality display) more accurately to a user.

BRIEF DESCRIPTION OF THE DRAWINGS

So that the manner in which the above recited features can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the contemplated embodiments may admit to other equally effective embodiments.

DETAILED DESCRIPTION

In the following description, numerous specific details are set forth to provide a more thorough understanding of the various embodiments. However, it will be apparent to one of skill in the art that various embodiments may be practiced without one or more of these specific details.

System Overview

Figure 1:
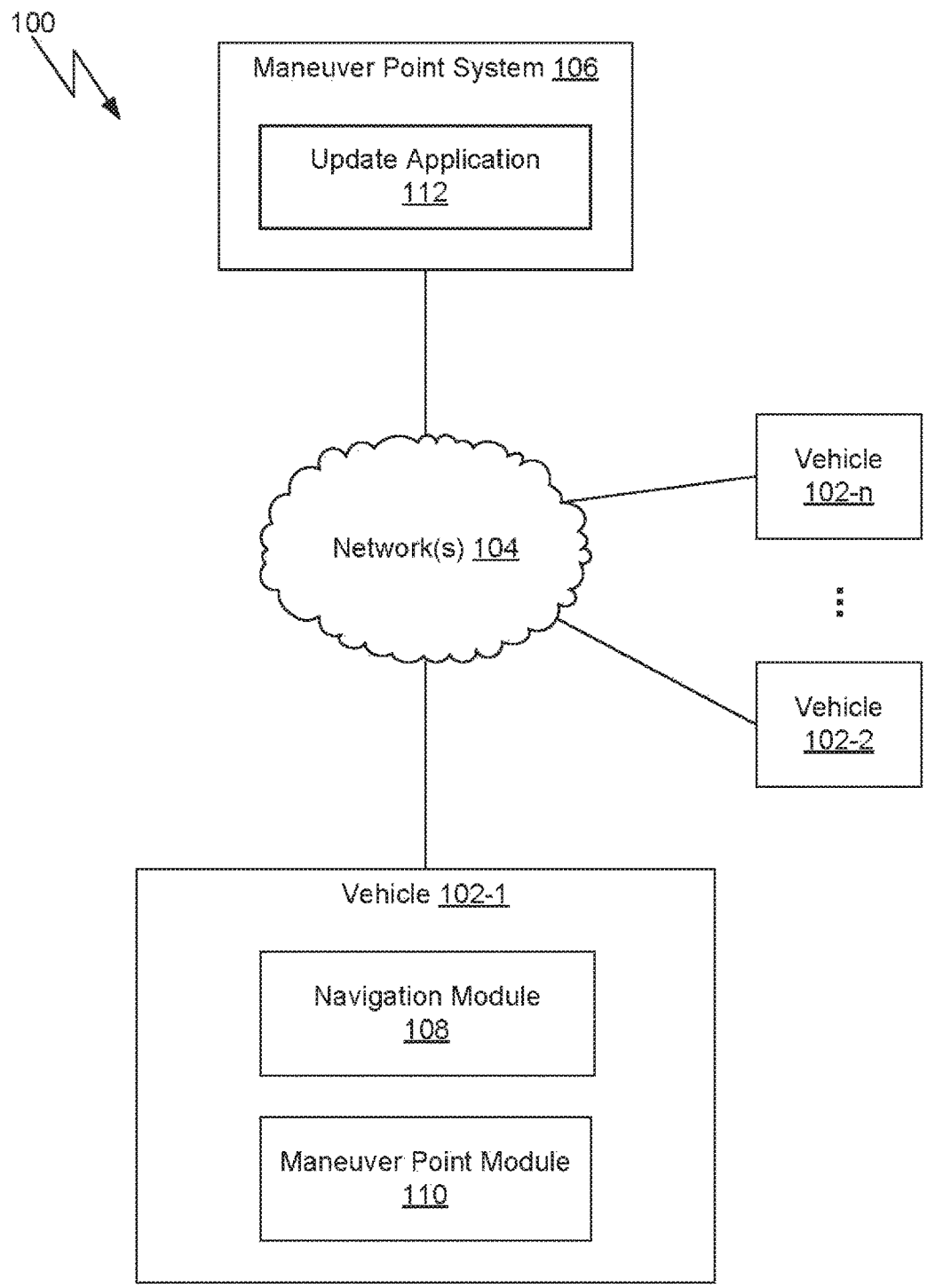
FIG. 1 is a conceptual diagram illustrating a maneuver point data network, according to one or more aspects of the various embodiments.

FIG. 1 is a conceptual diagram illustrating a maneuver point data network, according to one or more aspects of the various embodiments. As shown, maneuver point data network 100 includes one or more vehicles 102 (e.g., vehicles 102-1 thru 102-*n*). In various embodiments, each vehicle 102 may be travelling on a road and may be driven by a human driver or by an autonomous driver system. The vehicles 102 may be communicatively coupled to a maneuver point system 106 via one or more networks 104. The network(s) 104 may include one or more of a wide area network (WAN), local area network (LAN), wireless networks (e.g., a Wi-Fi network, a cellular network, a vehicle-to-vehicle network), the Internet, and so forth.

A vehicle 102 may include a navigation module 108. The navigation module 108 may determine a route between two geographical locations. The navigation module 108 may determine the route based on map data stored locally (e.g., at the vehicle) and/or remotely (e.g., in a database of a navigation service). The route may include one or more maneuver points. In various embodiments, each maneuver point may correspond to a point along the route at which a maneuver (e.g., turning at an intersection, exiting a freeway via an off ramp, entering a freeway via an on-ramp, merging onto a road, etc.) should be performed by a vehicle that is following the route. A given maneuver point may have a geographical location, such as a location identified by a latitude, a longitude, and/or an elevation.

The navigation module 108 may display the route via a display device in the vehicle. The route may be displayed in conjunction with a virtual representation of the road (e.g., a two-dimensional or three-dimensional virtual map) and/or a live view of the road that is displayed on the display device. For example, a live camera view of the road could be displayed on a display device and graphical indications of the route could be superimposed on the live camera view. As another example, a projection display device could project graphical indications of the route onto a windshield of the vehicle, such that a human driver of the vehicle would see the graphical indications overlaid on the driver's view of the road.

For a given maneuver point along the route, the navigation module 108 may display a maneuver indicator. In some embodiments, the maneuver indicator is a graphical object indicating that a maneuver should be performed at a particular location by a vehicle following the route (e.g., a location in a lane at which the maneuver should be performed). For example, a maneuver indicator for a right turn maneuver could be a right turn arrow. The navigation module 108 could then display the right turn arrow on or over a virtual representation or a live view of the road, such that right turn arrow is positioned, from the perspective of a user, at the location at which the right turn should be initiated. In some embodiments, the maneuver indicator is displayed such that the indicator is placed on the geographical location of the maneuver point. For example, the right turn arrow could be positioned such that the right turn arrow begins at the geographical location of the maneuver point.

Vehicle 102 may include a maneuver point module 110. In various embodiments, maneuver point module 110 may determine one or more maneuver points and/or receive one or more maneuver points from a maneuver point system 106. The maneuver point module 110 may detect instances in which the vehicle 102 performed maneuvers based on changes in one or more parameters of the vehicle 102 (e.g., via one or more sensors on or in vehicle 102) and determine locations of the detected instances of the maneuvers. The maneuver point module 110 may also compare a maneuver point for a given maneuver (e.g., a maneuver point obtained from maneuver point system 106 or from maneuver point data 214) to locations of one or more instances of the vehicle 102 performing the same maneuver. The maneuver point module 110 may then transmit, to the maneuver point system 106, locations of the instances of the maneuver that deviate from the maneuver point by more than a threshold value.

As noted above, conventional approaches for displaying a maneuver indicator typically include analyzing map data to determine a maneuver point where a vehicle is likely to perform a maneuver and then displaying a maneuver indicator at a location that corresponds to the maneuver point. Notably, determining a maneuver point at which a corresponding maneuver indicator should be displayed in an augmented reality display can be difficult. For example, an intersection may include a dedicated right turn lane. However, map data associated with the intersection may not include sufficient detail indicating where a driver should perform a turn maneuver when entering and/or driving in such a turn lane. Consequently, as a driver approaches an intersection to perform a right turn, a corresponding maneuver indicator may not be displayed in the correct location from the perspective of the driver.

Accordingly, in various embodiments, a vehicle 102 may determine (e.g., via maneuver point module 110) a location at which a particular maneuver is performed (e.g., initiated) by a vehicle, referred to herein as a location of an instance of the maneuver. The location of the instance of the maneuver may then be transmitted to an update application, such as an update application 112 executed by the maneuver point system 106 and/or update application 216 executed by the maneuver point module 110. In some embodiments, prior to transmitting a location of the instance of a maneuver determined by maneuver point module 110, the maneuver point module 110 determines whether the location of the instance of the maneuver deviates from a location of a maneuver point for the maneuver (e.g., a preexisting maneuver point received from maneuver point system 106) by more than a threshold amount. If the location of the instance of the maneuver deviates from the location of the maneuver point by greater than the threshold amount (e.g., a threshold distance), then the location of the instance of the maneuver is transmitted to the update application. If, on the other hand, the location of the instance of the maneuver does not deviate from the location of the maneuver point by greater than the threshold amount, then the instance of the maneuver may be disregarded (e.g., the location of the instance of the maneuver may be discarded).

Upon receiving, from one or more vehicles, one or more locations of instances of a particular maneuver (e.g., a turn performed onto a particular road at a particular intersection), the update application (e.g., update application 112 and/or update application 216) may generate and/or update a maneuver point, such as by averaging one or more of the locations of the instances of the maneuver and updating the maneuver point to have the average location. The updated maneuver point may then be transmitted to and/or implemented by one or more vehicles, in order to display a maneuver indicator at a location on a display that corresponds to the updated maneuver point. In this manner, data associated with maneuvers performed by vehicles can be crowdsourced, and the location(s) at which vehicles typically perform maneuver(s) can be more accurately determined. This improved accuracy may, in turn, enable a corresponding maneuver indicator to be positioned more accurately on a display, such as by displaying a maneuver indicator on an AR display via navigation module 108.

Figure 2:
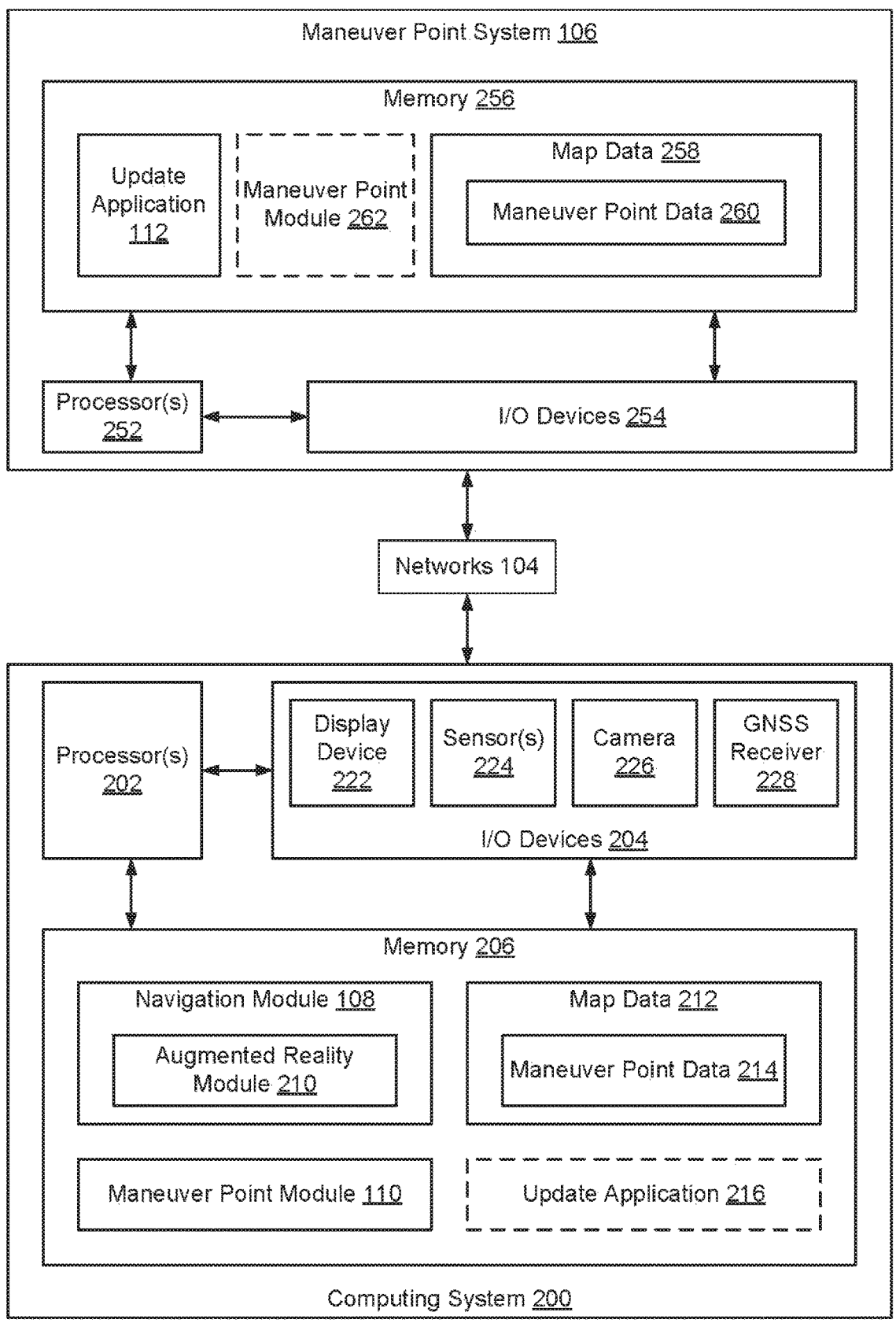
FIG. 2 is a block diagram illustrating a maneuver point system and a computing system that may be implemented by one or more vehicles of FIG. 1, according to one or more aspects of the various embodiments.

FIG. 2 illustrates maneuver point system 106 and a computing system 200 that may be implemented by one or more vehicles 102 of FIG. 1, according to one or more aspects of the various embodiments. As shown, maneuver point system 106 includes processor(s) 252, I/O devices 254, and memory 256. In some embodiments, maneuver point system 106 implements a vehicle navigation service.

Processor(s) 252 may be any technically feasible hardware unit configured to process data and execute program instructions. Processor(s) 252 could include, for example and without limitation, a central processing unit (CPU), a graphics processing unit (GPU), an application specific integrated circuit (ASIC), an field-programmable gate array (FPGA), and any combination thereof.

I/O devices 254 may include devices for receiving input and/or providing output. For example, and without limitation, I/O devices 254 could include a network communication device for communicating with vehicles 102 via network(s) 104. The network communication device may communicate with vehicles 102 using any suitable communications technology.

Memory 256 may include any technically feasible storage medium for storing data and software applications. Memory could include, for example, a random access memory (RAM) module, read-only memory (ROM) module, a hard disk drive, a solid state drive, flash memory, and so on. As shown in FIG. 2, memory 256 includes an update application 112, map data 258, and optionally maneuver point module 262.

Update application 112 receives the locations at which one or more vehicles 102 performed maneuvers. In some embodiments, update application 112 may receive only the locations (at which one or more vehicles 102 performed maneuvers) that differ by more than a threshold amount from the locations of stored maneuver points. For a given maneuver, update application 112 may then update a stored maneuver point based on received locations. In various embodiments, the update application 112 updates a maneuver point by determining an average (e.g., a centroid) location at which vehicles typically performed the maneuver. In some embodiments, this determination may take into account the location of the stored maneuver point that is being updated. The update application 112 may then store the updated maneuver point in maneuver point data 260 and/or transmit the updated maneuver point to one or more vehicles 102.

An optional maneuver point module 262 determines maneuver points for roads, connections between roads, etc. based on map data 258 and stores the maneuver points in maneuver point data 260. For example, a vehicle 102 could request a route from a navigation service that includes maneuver point system 106. The maneuver point system 106 may then determine one or more maneuver points associated with the route and/or read one or more maneuver points from maneuver point data 260.

The update application 112 and/or maneuver point module 262 may transmit maneuver point data 260 (e.g., stored maneuver points, updated maneuver points determined by update application 112, etc.) to one or more vehicles 102. A vehicle may store the maneuver point data 260 received from the maneuver point system 106 in maneuver point data 214. Map data 258 includes geographic data, including road and landmark data, for one or more geographic regions. Map data 258 may include data associated with roads and connections between roads, such as intersections, on ramps, off ramps, merging roads, etc.

As shown, computing system 200 includes one or more processors 202, I/O devices 204, and memory 206. Processor(s) 202 may be any technically feasible hardware unit configured to process data and execute program instructions. Processor(s) 202 could include, for example and without limitation, a central processing unit (CPU), a graphics processing unit (GPU), an application specific integrated circuit (ASIC), an field-programmable gate array (FPGA), and any combination thereof.

I/O devices 204 may include devices for receiving input and/or providing output. For example, and without limitation, I/O devices 204 could include a display device 222, one or more sensors 224, a camera 226, and a global navigation satellite system (GNSS) receiver 228.

The display device 222 may display a virtual representation or live view of a road and/or a route, including maneuver indicators, to a user. In some embodiments, the display device 222 is a display (e.g., a liquid crystal display, organic light-emitting diode (OLED) display, etc.). In some other embodiments, the display device 222 is a projection device that projects content (e.g., a route and/or maneuver indicators) within the vehicle, such as onto a windshield of the vehicle.

Sensors 224 may include one or more of a motion sensor, accelerometer, gyroscope, magnetometer, inertial sensor, and so forth. Sensors 224 are configured to detect one or more parameters of the vehicle, such as the orientation (e.g., heading, yaw, pitch, and roll) and elevation of the vehicle, and changes to the one or more parameters. In some embodiments, one or more parameters may be derived from parameters detected by the sensors 224. For example, a yaw rate, a steering angle, and/or a heading change could be derived from the orientation parameters and changes thereof detected by the sensors 224. Detected changes in the parameters of the vehicle may be used to determine whether the vehicle has initiated a maneuver.

Camera 226 may capture images (e.g., still images, video) of the environment in front of the vehicle (e.g., the road ahead of the vehicle). The images may be displayed in the vehicle via the display device 222. GNSS receiver 228 may communicate with a navigation satellite system (e.g., Global Positioning System) to determine the latitude and longitude of the location of the vehicle at any given moment.

I/O devices 204 may include one or more additional devices not shown in FIG. 2, such as a microphone, speaker, one or more control devices (e.g., buttons, dials, etc.), and/or a network communication device for communicating with maneuver point system 106 and/or other vehicles 102 via network(s) 104. The network communication device may communicate with maneuver point system 106 and/or other vehicles 102 using any suitable communications technology.

Memory 206 may include any technically feasible storage medium for storing data and software applications. Memory could include, for example, a random access memory (RAM) module, read-only memory (ROM) module, a hard disk drive, a solid state drive, flash memory, and so on. As shown in FIG. 2, memory 206 includes navigation module 108, maneuver point module 110, map data 212, and optionally update application 216. Navigation module 108 determines a position (e.g., geographic location) and orientation of the vehicle (e.g., in conjunction with sensors 224 and/or GNSS receiver 228). Navigation module 108 may determine a route between two given geographic locations using map data 212 (e.g., in response to a user request for a route). Navigation module 108 may also identify one or more maneuver points along the route. Navigation module 108 may present, in conjunction with display device 222, the route and maneuver indicators for the maneuver points along the route to a user.

In some embodiments, the navigation module 108 includes an augmented reality module 210. The augmented reality module 210 determines display positions for graphical objects indicating the route, such as maneuver indicators, superimposed on a live view (e.g., live images from camera 226, a user's live view). The augmented reality module 210 may correlate the display positions to geographic locations. For example, the augmented reality module 210 could determine a display position for a maneuver indicator corresponding to a maneuver point so that, when displayed, the display position of the maneuver indicator from the perspective of the user corresponds to a geographic location of the maneuver point. In some embodiments, the navigation module 108 and augmented reality module 210 display maneuver indicators such that, from the perspective of the user, the maneuver indicators appear as if painted onto roads similar to the manner in which actual guidance arrows or text is painted onto roads.

Map data 212 includes geographic data, including road and landmark data, for one or more geographic regions. Map data 212 may include data on roads and connections between roads. The maneuver point data 214 may include maneuver points determined from map data 212 (e.g., by maneuver point module 110) and/or maneuver points received from a maneuver point system 106. Maneuver point data 214 may also include locations of detected instances of maneuvers performed by the vehicle 102.

In operation, maneuver point module 110 determines maneuver points for roads and connections between roads based on map data 212 and stores the maneuver points in maneuver point data 214. Maneuver point module 110 may also detect the performance of a maneuver by a vehicle based on changes in the parameters of the vehicle, in conjunction with navigation module 108, sensors 224, and/or GNSS receiver 228. In some embodiments, maneuver point module 110 may determine that the vehicle 102 has performed a maneuver by detecting that certain parameters have changed beyond respective thresholds. For example, maneuver point module 110 could detect that the vehicle 102 has started a turn by detecting that changes in parameters associated with orientation (e.g., heading, etc.) or parameters derived from the parameters associated with orientation (e.g., yaw rate, steering angle, and/or heading change) for the vehicle 102 have changed by more than respective thresholds.

The maneuver point module 110 may receive locations of instances of a maneuver performed by a vehicle and determine a difference between the locations and a location of a corresponding maneuver point. In some embodiments, the difference is a distance between a location of the maneuver point and a location of an instance of the maneuver. If the difference is greater than a threshold, then the maneuver point module 110 may record the location of the instance of the maneuver in memory 206 (e.g., in maneuver point data 214). Further, the maneuver point module 110 may transmit the location of the instance of the maneuver to update application 112 at maneuver point system 106 or in memory 206. Maneuver point module 110 may also receive maneuver points from maneuver point system 106 (e.g., from update application 112) and store these maneuver points in maneuver point data 214.

Optional update application 216 may perform similar operations as update application 112 included in maneuver point system 106. Update application 216 may receive locations of instances of a maneuver performed by the vehicle 102. In some embodiments, update application 216 may receive only locations of instances of a maneuver that differ from a maneuver point for the maneuver by more than a threshold. The update application 216 then updates a maneuver point in maneuver point data 214 based on the received locations of instances of the maneuver. In some embodiments, the update application 216 updates a maneuver point for a maneuver by determining an average location of the received locations of instances of the maneuver and updating the location of the maneuver point with the average location. The update application 216 may store the updated maneuver point in maneuver point data 214.

In some embodiments, the maneuver point module 110 and update application 216 may be components of the navigation module 108. For example, a vehicle 102 could include navigation module 108, which would then include, implement, and/or communicate with the maneuver point module 110 and the update application 216.

Thus, as shown in FIG. 2, maneuver points may be updated at a maneuver point system 106 remote from the vehicles 102 or locally at a vehicle 102. In some embodiments, maneuver points stored in maneuver point data 260 may be updated at a maneuver point system 106 and transmitted to one or more vehicles 102. In some other embodiments, maneuver points stored at maneuver point data 214 may be updated locally at the vehicle 102.

Figure 3:
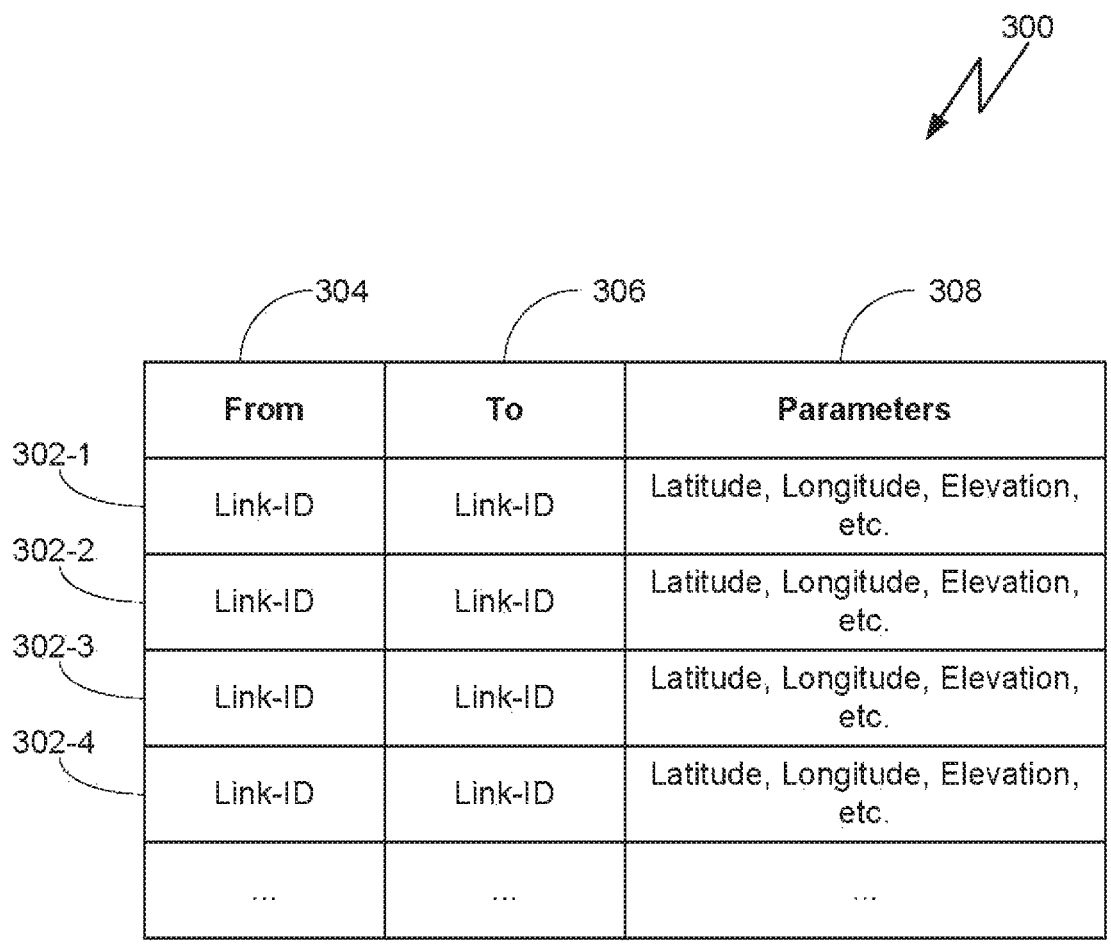
FIG. 3 is a diagram illustrating an example data structure for storing maneuver point data, according to one or more aspects of the various embodiments.

FIG. 3 is a diagram illustrating a data structure for storing maneuver point data, according to one or more aspects of the various embodiments. In some embodiments, the data structure 300 for storing maneuver point data (e.g., maneuver point data 214 or 260) may include a table having entries 302 and fields 304, 306, and 308. Each entry 302 corresponds to a maneuver point for a particular maneuver at a particular road or connection. An entry 302 for a maneuver point may include data for each of the fields 304, 306, and 308.

Field 304 is a "From" field. The "From" field 304 identifies a road on which a maneuver is initiated. For example, for a turn maneuver, the "From" field could indicate the road from which a vehicle turns. As another example, for a freeway exit maneuver, the "From" field could indicate a freeway from which the vehicle exits.

Field 306 is a "To" field. The "To" field 306 identifies a road on which a vehicle ends a maneuver. For example, for a turn maneuver, the "To" field could indicate the road into which the vehicle has turned. As another example, for a freeway exit maneuver, the "To" field indicates an off ramp onto which the vehicle enters to exit the freeway.

In some embodiments, roads in map data 212 or map data 258, and in data structure 300 as well, may be identified with link identifiers (or "Link-IDs"). Each road includes one or more links identified by one or more Link-IDs in map data 212 or map data 258. Thus, for a given entry 302 for a maneuver point, the data for the "From" field 304 and "To" field 306 may be respective Link-IDs of the particular roads along with a maneuver is performed.

The "parameters" field 308 may indicate a location of the maneuver. For example, the parameters may include a latitude, a longitude, and an elevation of a maneuver point. In some embodiments, in lieu of field 308, data structure 300 may have an individual field for each of the parameters included in parameters field 308.

In various embodiments, data structure 300 may further include a timestamp field. For example, in a data structure 300 storing locations of instances of a maneuver, entries associated with old instances (e.g., older than a predefined time threshold) of a particular maneuver may be removed. In this manner, locations of the instances of a particular maneuver in the data structure 300 are more recent and, thus, better reflect current conditions for the road(s) associated with the maneuver.

Figure 4A:
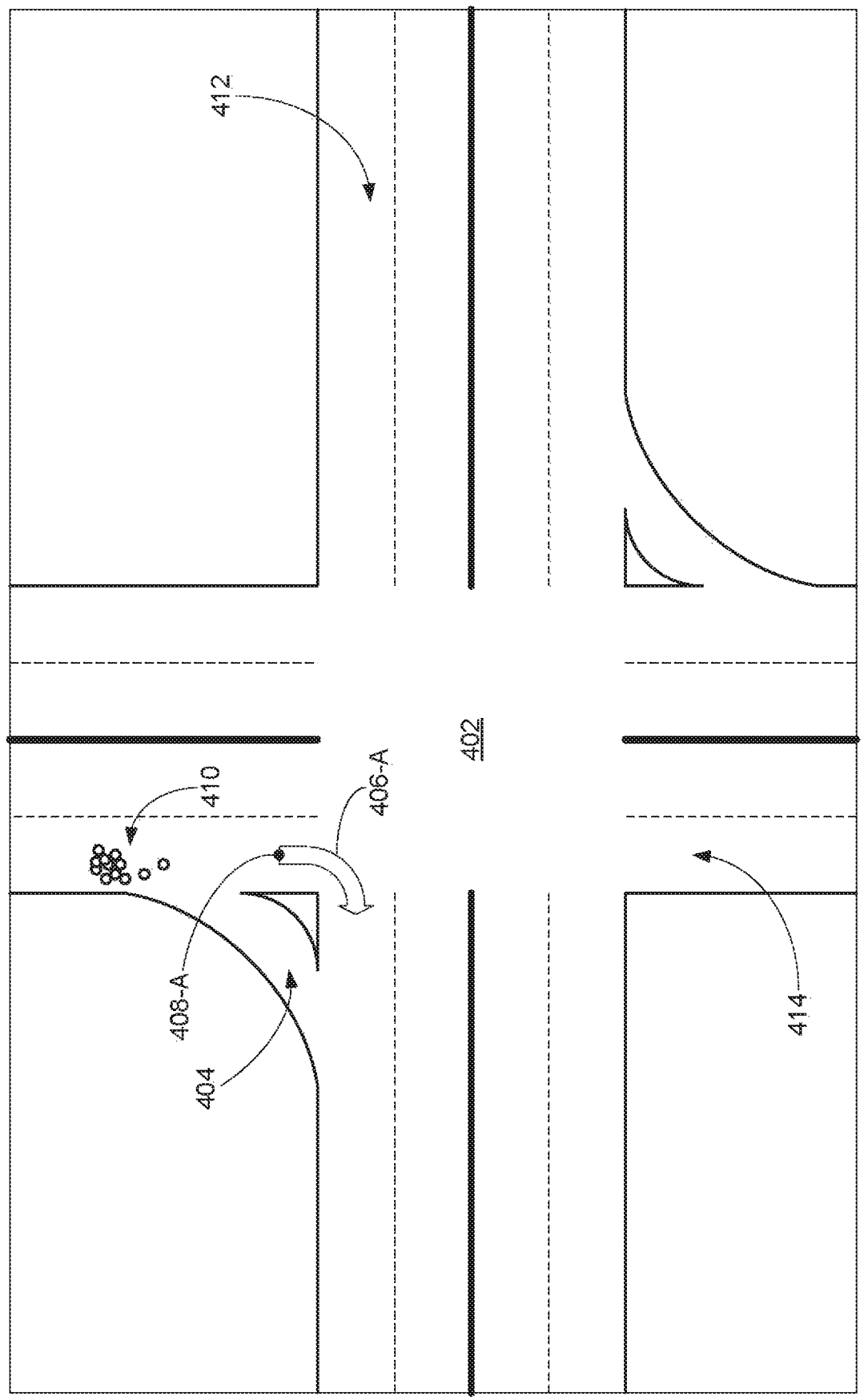
FIGS. 4A and 4B illustrate maneuver points and maneuver indicators associated with a right turn lane of a road intersection, according to one or more aspects of the various embodiments.
Figure 4B:
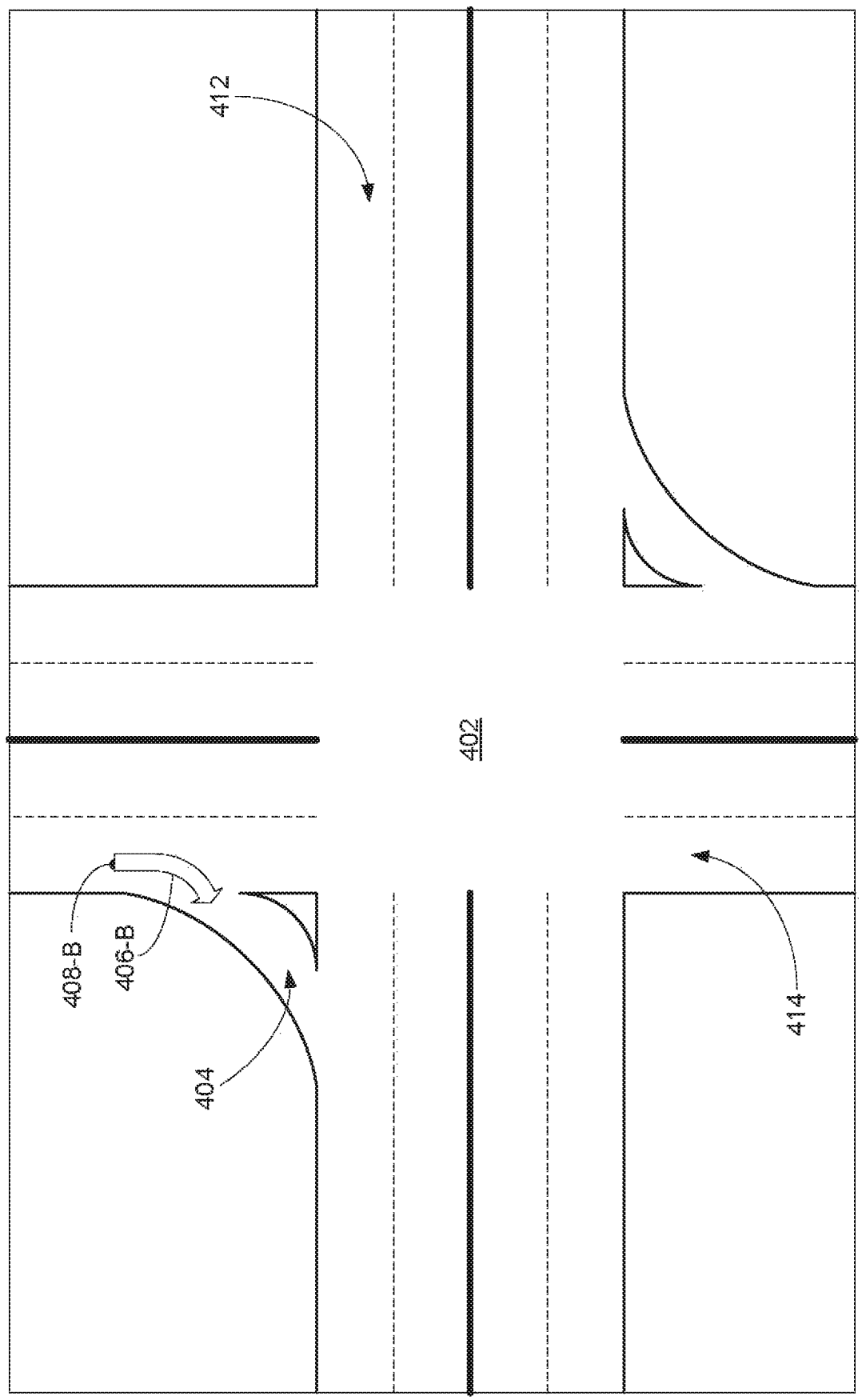

FIGS. 4A and 4B illustrate maneuver points and maneuver indicators associated with a right turn lane of a road intersection, according to one or more aspects of the various embodiments. As shown, FIG. 4A shows a two-dimensional map view of an intersection 402 of roads 412 and 414. Road 414 includes a dedicated right turn lane 404 for making a right turn maneuver onto road 412.

Maneuver point data 214 or 260 may include a maneuver point 408-A corresponding to a right turn from road 414 onto road 412. Maneuver point 408-A may be determined via conventional means. Consequently, as shown, a maneuver indicator 406-A that corresponds to the maneuver point 408-A is not displayed at the correct location relative to the right turn lane 404.

Accordingly, in various embodiments, as vehicles perform the right turn maneuver shown in FIGS. 4A and 4B, one or more locations 410 at which the vehicles initiate the right turn may be determined (e.g., by a maneuver point module 110 included in each vehicle). The locations 410 are then transmitted to an update application 112/216, which generates a stored maneuver point for the right turn maneuver and/or updates a stored maneuver point to generate an updated maneuver point for the right turn maneuver. The updated maneuver point may then be transmitted to one or more vehicles so that a navigation module 108 of the vehicle(s) is able to display the maneuver indicator 406-B at the correct location, which corresponds to the location of the stored or updated maneuver point 408-B. As a result, as shown in FIG. 4B, users are able to view (e.g., via an AR display) a more accurate location at which the right turn maneuver should be performed.

Figure 5:
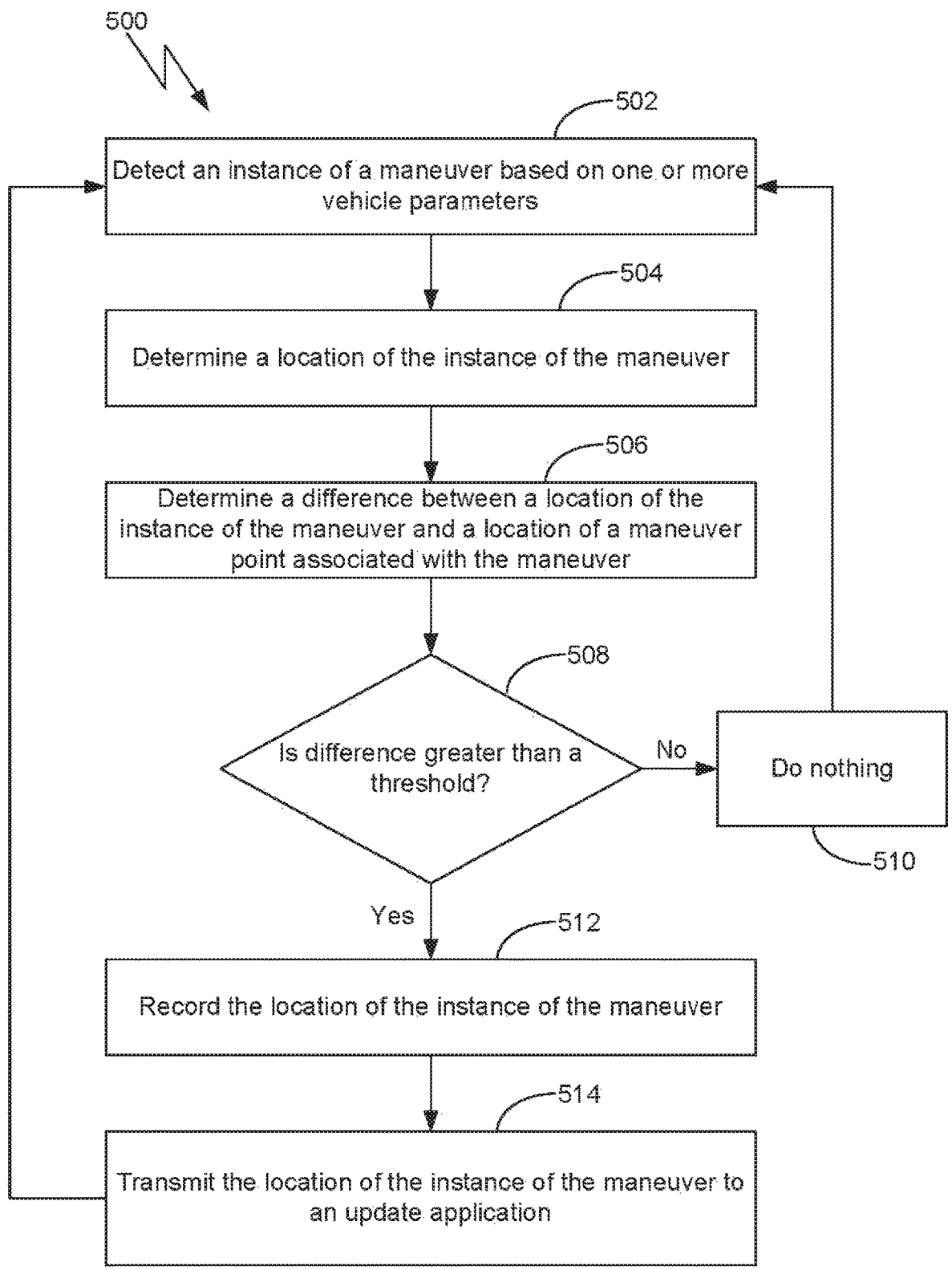
FIG. 5 is a flow diagram of method steps for determining and transmitting locations at which one or more vehicles performed a maneuver, according to one or more aspects of the various embodiments.

FIG. 5 is a flow diagram of method steps for determining and transmitting locations at which one or more vehicles performed a maneuver, according to one or more aspects of the various embodiments. Although the method steps are described with respect to the system(s) of FIG. 2, persons skilled in the art will understand that any system configured to implement the method steps, in any order, falls within the scope of the contemplated embodiments.

As shown, a method 500 begins at step 502, where a maneuver point module 110 detects an instance of a maneuver based on one or more vehicle parameters. For example, referring to the example right turn shown in FIGS. 4A and 4B, a vehicle 102 could be approaching an intersection 402 to make a right turn maneuver from road 414 onto road 412. A maneuver indicator 406-A located at a maneuver point 408-A for the right turn maneuver from road 414 onto road 412 could then be displayed to the user in vehicle 102. If the maneuver point module 110 of the vehicle 102—in conjunction with sensors 224, GNSS receiver 228, and/or navigation module 108—detects that one or more parameters of the vehicle 102 (e.g., location, heading, etc.) have changed by more than respective thresholds, then the maneuver point module 110 could determine that the vehicle 102 is performing a right turn maneuver from road 414 onto road 412.

At step 504, the maneuver point module 110 determines a location of the instance of the maneuver. The maneuver point module 110 may determine, in conjunction with navigation module 108 and/or GNSS receiver 228, the location where the instance of the maneuver was performed. For example, the maneuver point module 110 of the vehicle 102 could determine the location (e.g., a location 410) at which vehicle 102 initiates a right turn maneuver from road 414 onto road 412.

At step 506, the maneuver point module 110 determines a difference between the location of the instance of the maneuver and a location of a maneuver point associated with the maneuver. For example, the maneuver point module 110 could determine a distance between the location 410 determined in step 504 and the location of the maneuver point 408-A.

At step 508, if the maneuver point module 110 determines that the difference is not greater than a threshold (e.g., the distance is less than a predefined threshold distance), then the method 500 proceeds to step 510, where nothing is done. The method 500 then returns to step 502, where maneuver point module 110 may detect a new instance of a maneuver.

If, at step 508, the maneuver point module 110 determines that the difference is greater than a threshold (e.g., the distance is more than a predefined threshold distance), then the method 500 proceeds to step 512, where the maneuver point module 110 may record the location of the instance of the maneuver. The location may be recorded (e.g., logged) in maneuver point data 214 and structured according to data structure 300.

At step 514, the maneuver point module 110 may transmit the location of the instance of the maneuver to an update application. The maneuver point module 110 may transmit the location locally to update application 216 or remotely to update application 112 of maneuver point system 106. The method 500 may then proceed to step 502, where maneuver point module 110 may detect a new instance of a maneuver.

Figure 6:
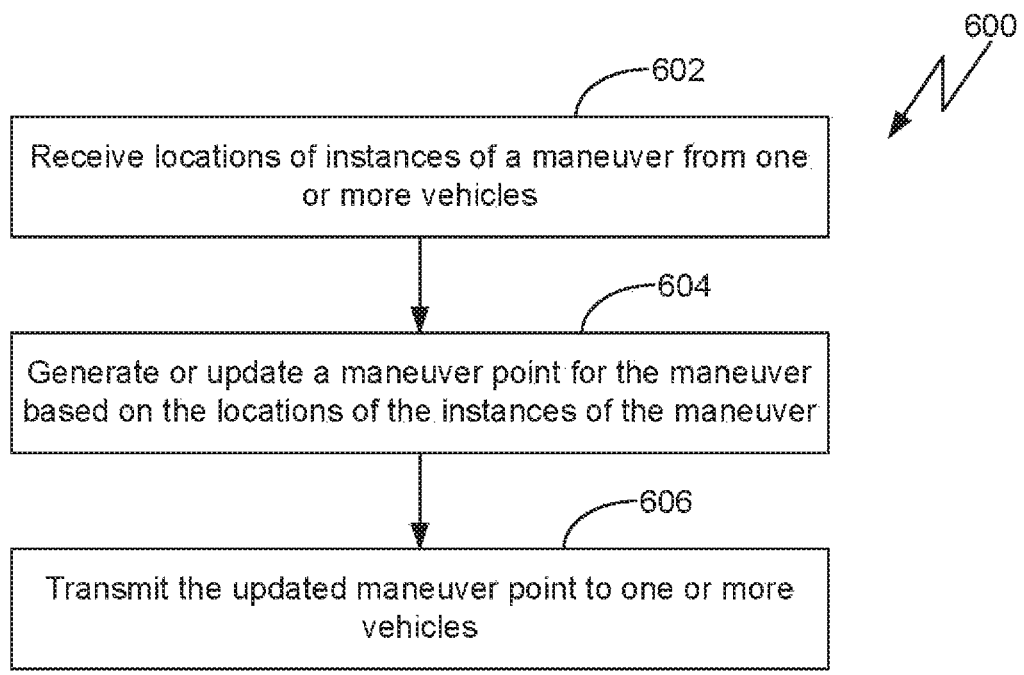
FIG. 6 is a flow diagram of method steps for determining an updated maneuver point and transmitting the updated maneuver point to one or more vehicles, according to one or more aspects of the various embodiments.

FIG. 6 is a flow diagram of method steps for transmitting an updated maneuver point to one or more vehicles, according to one or more aspects of the various embodiments. Although the method steps are described with respect to the system(s) of FIG. 2, persons skilled in the art will understand that any system configured to implement the method steps, in any order, falls within the scope of the contemplated embodiments.

As shown, method 600 begins at step 602, wherein an update application 112 at maneuver point system 106 receives locations of instances of a maneuver from one or more vehicles 102. For example, for a right turn from road 414 onto road 412, the update application 112 could receive locations 410 of instances of the right turn, as performed by one or more vehicles 102.

At step 604, the update application 112 may generate a stored maneuver point or update a stored maneuver point for the maneuver based on the location(s) of the instance(s) of the maneuver. For example, update application 112 could update maneuver point 408-A for the right turn from road 414 onto road 412 based on locations 410, as described above in conjunction with FIGS. 4A and 4B. In some embodiments, the updating may include determining an average (e.g., centroid) location of the locations 410 and assigning the average location to maneuver point 408, thus updating maneuver point 408 to updated maneuver point 408-B.

At step 606, the update application 112 may transmit the updated maneuver point to one or more vehicles 102. For example, the update application 112 could transmit maneuver point 408-B to one or more vehicles 102 (e.g., to a maneuver point module 110 included in each vehicle 102). The maneuver point module 110 of a vehicle may then store the updated maneuver point 408-B in maneuver point data 214.

Figure 7:
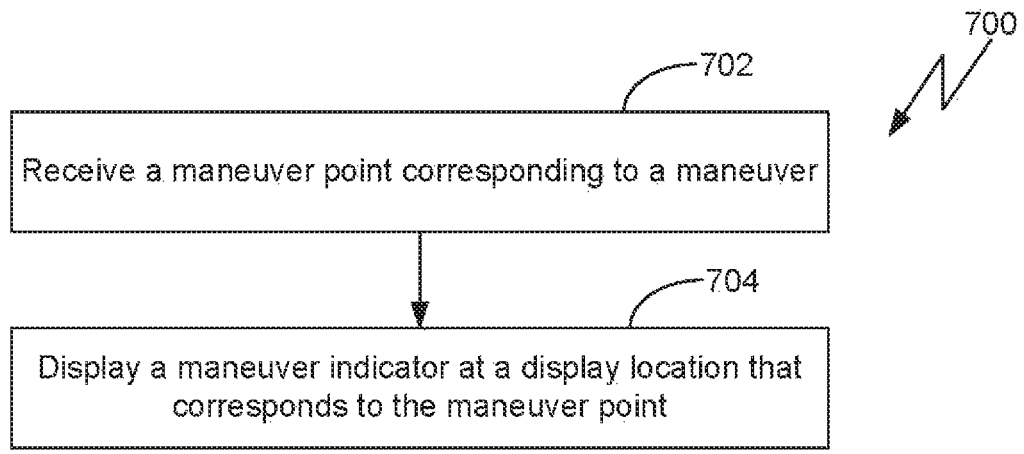
FIG. 7 is a flow diagram of method steps for displaying a maneuver indicator according to a maneuver point, according to one or more aspects of the various embodiments.

FIG. 7 is a flow diagram of method steps for displaying a maneuver indicator according to a maneuver point, according to one or more aspects of the various embodiments. Although the method steps are described with respect to the system(s) of FIG. 2, persons skilled in the art will understand that any system configured to implement the method steps, in any order, falls within the scope of the contemplated embodiments.

As shown, a method 700 begins at step 702, where a navigation module 108 at a vehicle 102 receives a maneuver point corresponding to a maneuver. For example, a navigation module 108 could determine a route that includes a right turn from road 414 onto road 412. The navigation module 108 may read maneuver point data 214 and receive from maneuver point data 214 a maneuver point 408 for the right turn from road 414 onto road 412.

At step 704, the navigation module 108 displays a maneuver indicator at a display location that corresponds to the maneuver point. For example, the navigation module 108 could display a maneuver indicator 406 that starts from maneuver point 408. Particularly, augmented reality module 210 could cause a maneuver indicator 406 to be displayed at a display location on a live view of the roads such that the display location on the live view corresponds to the location of maneuver point 408.

In sum, a location of a maneuver performed by a vehicle is determined. If the location at which the vehicle performs the maneuver differs (e.g., by more than a threshold distance) from a location of a maneuver point associated with a maneuver indicator, then the location at which the vehicle performed the maneuver is logged, for example, by transmitting the location to an update application. The update application may then analyze multiple maneuver locations that have been logged for the same maneuver point to determine an updated location for the maneuver point at which to display the maneuver indicator. The updated maneuver point may then be transmitted to one or more vehicles, enabling the vehicles to display a maneuver indicator at a location at which the maneuver should be performed.

One advantage of the disclosed techniques is that the location at which vehicles typically perform a maneuver (e.g., a turn at a road interaction) can be more accurately determined. Accordingly, a maneuver indicator that corresponds to the maneuver can be displayed (e.g., on an augmented reality display) more accurately to a user—at a location on the display that corresponds to the location at which the maneuver should be performed. Additionally, if the location at which a particular maneuver is typically performed changes over time (e.g., due to construction, new roadways, closed roadways, etc.), then the update application can automatically update the location based on location data received from different vehicles that have performed the maneuver.

1. In some embodiments, a computer-implemented method comprises determining a first location at which a maneuver is initiated by a vehicle; determining a difference between the first location and a stored location that corresponds to the maneuver; and in response to determining that the difference exceeds a threshold value, transmitting the first location to an update application, wherein the update application modifies the stored location based on the first location to generate an updated location.

2. The method of clause 1, wherein the difference comprises a distance between the first location and the stored location.

3. The method of clauses 1 or 2, further comprising receiving the updated location; and causing an augmented reality (AR) display to display a maneuver indicator associated with the maneuver at a location that corresponds to the updated location.

4. The method of any of clauses 1-3, wherein determining the difference between the first location and the stored location comprises determining an elevation difference between the first location and the stored location, wherein the update application modifies an elevation of the stored location based on an elevation of the first location to generate the updated location.

5. The method of any of clauses 1-4, further comprising detecting that the maneuver is initiated by the vehicle by detecting a change in an orientation of the vehicle.

6. The method of any of clauses 1-5, wherein the maneuver comprises a turn at a road intersection.

7. The method of any of clauses 1-6, further comprising determining a second location at which a second maneuver is initiated by the vehicle; determining a second difference between the second location and a second stored location that corresponds to the second maneuver; in response to determining that the second difference exceeds the threshold value, transmitting the second location to the update application, wherein the update application modifies the second stored location based on the second location to generate an updated second location.

8. The method of any of clauses 1-7, wherein the update application modifies the stored location to generate the updated location based on the first location and a plurality of second locations, each second location included in the plurality of second locations corresponding to a location at which a different vehicle performed the maneuver.

9. The method of any of clauses 1-8, wherein the update application modifies the stored location to generate the updated location by determining a centroid of the first location and the plurality of second locations.

10. In some embodiments, a non-transitory computer-readable storage medium includes instructions that, when executed by one or more processors, configure the one or more processors to perform the steps of determining a first location at which a maneuver is performed by a vehicle; determining a distance between the first location and a stored location that corresponds to the maneuver; and in response to determining that the distance exceeds a threshold value, transmitting the first location to an update application, wherein the update application modifies the stored location based on the first location to generate an updated location.

11. The computer readable storage medium of clause 10, wherein the instructions further configure the one or more processors to detect that the maneuver is performed by the vehicle by detecting a change in one or more of a location and an orientation of the vehicle.

12. The computer readable storage medium of clauses 10 or 11, wherein the instructions further configure the one or more processors to perform the steps of receiving the updated location; and causing an augmented reality (AR) display to display a maneuver indicator associated with the maneuver at a location that corresponds to the updated location.

13. The computer-readable storage medium of any of clauses 10-12, wherein detecting a change in an orientation of the vehicle comprises detecting that one or more of a yaw rate, a steering angle, and a heading change exceeds a threshold.

14. The computer readable storage medium of any of clauses 10-13, wherein the maneuver comprises entering a roadway on-ramp.

15. The computer readable storage medium of any of clauses 10-14, wherein the update application modifies the stored location to generate the updated location based on the first location and a plurality of second locations, each second location included in the plurality of second locations corresponding to a location at which a vehicle performed the maneuver.

16. The computer readable storage medium of any of clauses 10-15, wherein the update application modifies the stored location to generate the updated location by determining a centroid of the first location and the plurality of second locations; and replacing the stored location with the centroid.

17. In some embodiments, a system comprises a memory storing instructions; and a processor coupled to the memory and, when executing the instructions, is configured to determine a first location at which a turn is initiated by a vehicle; determine a difference between the first location and a stored location that corresponds to the turn; and in response to determining that the difference exceeds a threshold value, transmit the first location to an update application, wherein the update application modifies the stored location based on the first location to generate an updated location.

18. The system of clause 17, wherein the difference comprises a distance between the first location and the stored location.

19. The system of clauses 17 or 18, wherein the processor is further configured to detect that the turn is initiated by the vehicle by detecting a change in an orientation of the vehicle.

20. The system of any of clauses 17-19, wherein the maneuver comprises a turn at a road intersection or a U-turn.

Any and all combinations of any of the claim elements recited in any of the claims and/or any elements described in this application, in any fashion, fall within the contemplated scope of the described embodiments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed towards embodiments of the present disclosure, other and further embodiments of the disclosure may be devised without departing from the basic scope thereof, and the scope thereof is determined by the claims that follow.

What is claimed is:

1. A computer-implemented method, comprising:
   determining a first location at which a maneuver is initiated by a vehicle;
   determining a difference between the first location at which the maneuver is initiated by the vehicle and a stored location that corresponds to the maneuver; and
   in response to determining that the difference between the first location at which the maneuver is initiated by the vehicle and the stored location that corresponds to the maneuver exceeds a threshold value, transmitting the first location to an update application, wherein the update application modifies the stored location based on the first location to generate an updated location.

2. The method of claim 1, wherein the difference comprises a distance between the first location and the stored location.

3. The method of claim 1, further comprising:
receiving the updated location; and
causing an augmented reality (AR) display to display a maneuver indicator associated with the maneuver at a location that corresponds to the updated location.

4. The method of claim 1, wherein determining the difference between the first location and the stored location comprises determining an elevation difference between the first location and the stored location, wherein the update application modifies an elevation of the stored location based on an elevation of the first location to generate the updated location.

5. The method of claim 1, further comprising detecting that the maneuver is initiated by the vehicle by detecting a change in an orientation of the vehicle.

6. The method of claim 5, wherein the maneuver comprises a turn at a road intersection.

7. The method of claim 1, further comprising:
determining a second location at which a second maneuver is initiated by the vehicle;
determining a second difference between the second location and a second stored location that corresponds to the second maneuver;
in response to determining that the second difference exceeds the threshold value, transmitting the second location to the update application, wherein the update application modifies the second stored location based on the second location to generate an updated second location.

8. The method of claim 1, wherein the update application modifies the stored location to generate the updated location based on the first location and a plurality of second locations, each second location included in the plurality of second locations corresponding to a location at which a different vehicle performed the maneuver.

9. The method of claim 8, wherein the update application modifies the stored location to generate the updated location by determining a centroid of the first location and the plurality of second locations.

10. A non-transitory computer-readable storage medium including instructions that, when executed by one or more processors, configure the one or more processors to perform the steps of:
determining a first location at which a maneuver is initiated by a vehicle;
determining a difference between the first location at which the maneuver is initiated by the vehicle and a stored location that corresponds to the maneuver; and
in response to determining that the difference between the first location at which the maneuver is initiated by the vehicle and the stored location that corresponds to the maneuver exceeds a threshold value, transmitting the first location to an update application, wherein the update application modifies the stored location based on the first location to generate an updated location.

11. The computer readable storage medium of claim 10, wherein the instructions further configure the one or more processors to detect that the maneuver is performed by the vehicle by detecting a change in one or more of a location and an orientation of the vehicle.

12. The computer readable storage medium of claim 10, wherein the instructions further configure the one or more processors to perform the steps of:
receiving the updated location; and
causing an augmented reality (AR) display to display a maneuver indicator associated with the maneuver at a location that corresponds to the updated location.

13. The computer-readable storage medium of claim 11, wherein detecting a change in an orientation of the vehicle comprises detecting that one or more of a yaw rate, a steering angle, and a heading change exceeds a threshold.

14. The computer readable storage medium of claim 11, wherein the maneuver comprises entering a roadway on-ramp.

15. The computer readable storage medium of claim 10, wherein the update application modifies the stored location to generate the updated location based on the first location and a plurality of second locations, each second location included in the plurality of second locations corresponding to a location at which a vehicle performed the maneuver.

16. The computer readable storage medium of claim 15, wherein the update application modifies the stored location to generate the updated location by:
determining a centroid of the first location and the plurality of second locations; and
replacing the stored location with the centroid.

17. A system, comprising:
a memory storing instructions; and
a processor coupled to the memory and, when executing the instructions, is configured to:
determine a first location at which a turn is initiated by a vehicle;
determine a difference between the first location at which the maneuver is initiated by the vehicle and a stored location that corresponds to the turn; and
in response to determining that the difference between the first location at which the maneuver is initiated by the vehicle and the stored location that corresponds to the maneuver exceeds a threshold value, transmit the first location to an update application, wherein the update application modifies the stored location based on the first location to generate an updated location.

18. The system of claim 17, wherein the difference comprises a distance between the first location and the stored location.

19. The system of claim 17, wherein the processor is further configured to detect that the turn is initiated by the vehicle by detecting a change in an orientation of the vehicle.

20. The system of claim 19, wherein the maneuver comprises a turn at a road intersection or a U-turn.

* * * * *